(12) United States Patent
Kolehmainen

(10) Patent No.: US 12,537,399 B2
(45) Date of Patent: Jan. 27, 2026

(54) STATOR BODY FOR AN AXIAL FLUX ELECTRIC MACHINE AND METHOD FOR MANUFACTURING SUCH A STATOR BODY

(71) Applicant: RENAULT S.A.S, Boulogne Billancourt (FR)

(72) Inventor: Jere Kolehmainen, Saint-Aubin-les-Elbeuf (FR)

(73) Assignee: AMPERE S.A.S., Boulogne Billancourt (FR)

( * ) Notice: Subject to any disclaimer, the term of this patent is extended or adjusted under 35 U.S.C. 154(b) by 240 days.

(21) Appl. No.: 18/258,166

(22) PCT Filed: Nov. 30, 2021

(86) PCT No.: PCT/EP2021/083578
§ 371 (c)(1),
(2) Date: Jul. 7, 2023

(87) PCT Pub. No.: WO2022/128449
PCT Pub. Date: Jun. 23, 2022

(65) Prior Publication Data
US 2024/0055912 A1  Feb. 15, 2024

(30) Foreign Application Priority Data
Dec. 18, 2020 (FR) ..................................... 20 13596

(51) Int. Cl.
*H02K 1/14* (2006.01)
*H02K 15/022* (2025.01)

(52) U.S. Cl.
CPC ........... *H02K 1/148* (2013.01); *H02K 15/022* (2013.01)

(58) Field of Classification Search
CPC ...... H02K 1/148; H02K 1/182; H02K 15/022; H02K 15/026
See application file for complete search history.

(56) References Cited

U.S. PATENT DOCUMENTS 5,208,503 A  5/1993  Hisey
5,235,231 A  8/1993  Hisey
(Continued)

FOREIGN PATENT DOCUMENTS

| CN | 108900057 A | * 11/2018 | ............. H02K 21/24 |
| FR | 2 382 123 A1 | 9/1978 | |
| WO | WO 92/19035 A1 | 10/1992 | |

OTHER PUBLICATIONS

International Search Report issued Feb. 24, 2022 in PCT/EP2021/083578, filed on Nov. 30, 2021, 2 pages.
(Continued)

*Primary Examiner* — Christopher M Koehler
*Assistant Examiner* — Ethan Nguyen Vo
(74) *Attorney, Agent, or Firm* — Oblon, McClelland, Maier & Neustadt, L.L.P.

(57) ABSTRACT

A stator body for an axial flux electric machine includes a base having layers of metal sheet which are wound around a longitudinal axis, the base having an end face substantially orthogonal to the longitudinal axis, and teeth distributed and fixed on the end face of the base. The base includes a plurality of angular portions distributed about the longitudinal axis, each angular portion including at least one of the layers which is flat. The layer which is flat is attached to a layer of an adjacent angular portion by a fold situated at the fixing of one of the teeth to the base.

9 Claims, 3 Drawing Sheets

(56) References Cited

U.S. PATENT DOCUMENTS

| | | | |
|---|---|---|---|
| 12,266,971 B2* | 4/2025 | Takeda | H01F 3/02 |
| 2015/0349591 A1* | 12/2015 | Deguchi | H02K 21/24 |
| | | | 310/91 |
| 2020/0021174 A1* | 1/2020 | Lee | H02K 15/021 |
| 2020/0328634 A1* | 10/2020 | Mihaila | H02K 15/022 |

OTHER PUBLICATIONS

French Preliminary Search Report & written opinion issued Aug. 24, 2021 in FR 20 13596, filed on Dec. 18, 2020, 8 pages (with English Translation of Categories of Cited Documents).

* cited by examiner

STATOR BODY FOR AN AXIAL FLUX ELECTRIC MACHINE AND METHOD FOR MANUFACTURING SUCH A STATOR BODY

BACKGROUND

The present invention relates in general to axial flux electric machines.

It relates more specifically to a stator body for an axial flux electric machine, comprising:
a base comprising layers of metal sheet which are wound around a longitudinal axis, the base having an end face substantially orthogonal to the longitudinal axis, and teeth distributed and fixed on the end face of the base.

The invention finds a particularly advantageous application in electric motors for electric or hybrid motor vehicles.

It also relates to a method for manufacturing such a stator body.

A conventional stator for an axial flux electric machine comprises a body with a base of annular overall shape and teeth distributed circumferentially on one of the end faces of the base. A stator also comprises coils of conducting wire arranged around the teeth. Under the effect of electric currents, the coils generate magnetic fields allowing the stator to cause the rotor to move.

Conventionally, the body of the stator is made by winding a metal sheet around a longitudinal axis. This winding of the metal sheet makes it possible to limit the eddy currents that pass through the stator when the latter is in operation and, thus, to reduce energy losses caused by heating.

During winding, the metal sheet, which was originally flat, is deformed: it is curved in such a way as to form the annular base of the stator body. However, curving a metal sheet, which is to say applying a bending stress to it, impairs its magnetic properties and particularly its magnetic conductivity. The more tightly the sheets are curved, the greater the degradation of their magnetic properties. This degradation of the magnetic properties is even more pronounced when the metal sheets are oriented-grain sheets.

This degradation of the magnetic properties of the metal sheet reduces the efficiency of the stator thus formed. In other words, the stator would be less sensitive to core losses if the metal sheet had maintained its original magnetic properties. Core losses notably include eddy current losses, hysteresis losses and losses caused by infinitesimally small movements of the sheets.

One known technique for partially restoring the magnetic properties of a curved sheet is to heat the stator body to a very high temperature, typically between 700° C. and 800° C. Nevertheless, such heating has the undesirable effect of deteriorating or reducing the thickness of the insulating layer present on the surface of the magnetic sheet. The deterioration, or reduction in thickness, of the insulating layer contributes to increasing the eddy current losses when the stator is in operation. The restauration of the magnetic properties of the stator using this technique is therefore limited. In addition, heating the stator body to a high temperature is costly in terms of energy and ill suited to mass production.

BRIEF SUMMARY

In order to overcome the aforementioned disadvantages of the prior art, the present invention proposes a stator body having flat sheet-metal layers.

More particularly, the invention proposes a stator body as defined in the introduction, wherein provision is made for the base to comprise a plurality of angular portions distributed about the longitudinal axis, each angular portion comprising at least one flat layer, said flat layer being attached to a layer of an adjacent angular portion by a fold situated at the fixing of one of the teeth to the base.

The applicant has effectively found that, in certain portions of the base of the stator body, the circulation of the magnetic flux generated by the coils is not as good. These portions are chiefly located at the fixing of the teeth to the end face, namely at the junction between the teeth and the base. The magnetic flux thus circulates chiefly through the angular portions situated between pairs of adjacent teeth.

With the stator body according to the invention, at least part of the layers of metal sheet is flat in the angular portions. That means that no bending stress is applied to these flat layers compared with the flat original shape of the sheet.

Thus, by virtue of the invention, the magnetic properties of the flat metal sheets are maintained in the angular portions, which is to say in the regions where the circulation of flux is at a maximum and therefore in the regions where the stator is most liable to suffer from core losses. The magnetic performance of the stator comprising such a body is therefore improved.

In other words, the stator body according to the invention makes it possible to limit the degradation by curvature of the magnetic properties of the metal sheets to folds situated at the fixing of the teeth to the end face, and therefore to parts of the base which by construction make only a little contribution to the core losses.

In addition and as a result, the stator according to the invention does not need to be heated to a high temperature in order to exhibit satisfactory magnetic performance.

Further advantageous and nonlimiting features of the stator body according to the invention, considered individually or in any technically possible combinations, are as follows:
each angular portion comprises at least one other layer which is flat and substantially parallel to said flat layer;
each angular portion comprises at least another layer which is curved about an axis parallel to the longitudinal axis;
the base comprises, on its end face, at least one recessed relief, at least one of said teeth having a shape part of which complements that of the recessed relief and is set into the recessed relief;
each angular portion comprises at least two layers attached by at least two folds to at least two layers of an adjacent angular portion, said at least two folds having radii of curvature that increase with their distance from the longitudinal axis;
each angular portion comprises at least two layers attached by at least two folds to at least two layers of an adjacent angular portion, said at least two folds having radii of curvature that are substantially constant;
said flat layer extends in a plane parallel to the longitudinal axis;
said flat layer is oriented-grain with the grain running substantially parallel to the end face and to the plane in which said flat layer extends;
each angular portion comprises at least two layers of metal sheet, two neighboring layers being separated by an electrically insulating layer.

The invention also proposes a method for manufacturing a stator body as described hereinabove, comprising the following steps:
e1) winding the layers around a support;

e2) during winding, bending the metal sheet in such a way as to form the folds;

e3) manufacturing teeth and fixing the teeth onto the end face.

Of course, the various features, variants and embodiments of the invention can be combined with one another in various combinations provided that they are not mutually incompatible or mutually exclusive.

BRIEF DESCRIPTION OF THE DRAWINGS

The following description, which makes reference to the attached drawings, which are given by way of nonlimiting examples, will make it easy to understand what the invention consists in and how it may be embodied.

In the attached drawings.

DETAILED DESCRIPTION

Figure 1:
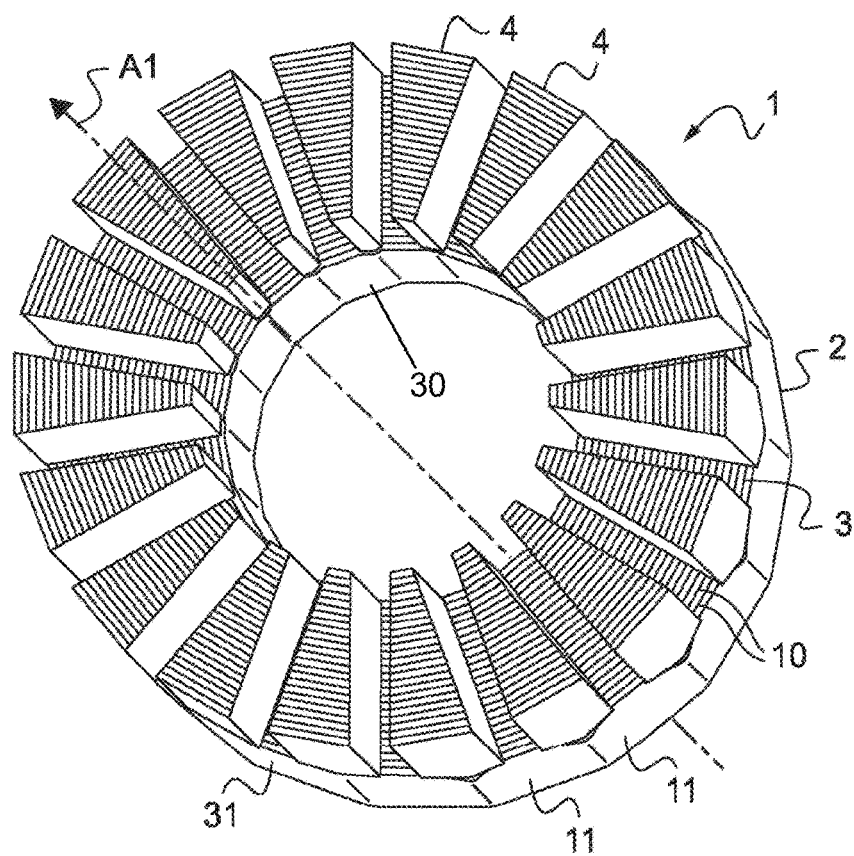
FIG. 1 is a schematic perspective view of a stator body according to a first embodiment of the invention.

FIG. 1 depicts a stator body 1 comprising a base 2 and teeth 4.

The base 2 has a shape that is annular overall about a longitudinal axis A1, with a radial section (in a half-plane leading out from the longitudinal axis A1) that is rectangular in shape. Here, the longitudinal axis A1 corresponds to an axis of rotation of a rotor with which the stator is intended to collaborate.

This base 2 thus has an internal face 30 which delimits a central recess, an external face 31 and two end faces which are substantially perpendicular to the longitudinal axis A1.

The teeth 4 are fixed to one of these two end faces 3. They are uniformly distributed about the longitudinal axis A1. Each tooth has the overall shape of a right prism, of trapezoidal cross section (in a plane orthogonal to the longitudinal axis A1). The facing lateral faces of neighboring teeth here are mutually parallel.

The thickness of the base 2, which is to say its dimension along the longitudinal axis A1, is for example comprised between 5 mm and 30 mm. The diameter of the base 2 is preferably comprised between 10 cm and 50 cm.

The teeth 4 here are attached to the base 2. Here they are each manufactured from a stack of flat sections of a metal sheet identical to the one used to manufacture the base 2, which is to say here having the same thickness and made from the same material. The layers are superposed in a radial direction relative to the longitudinal axis A1. The teeth 4 are fixed to the base 2, for example by bonding, welding, screwing or bolting.

The base 2 comprises layers 10 of a magnetically conducting metal sheet. The metal sheet is for example made of steel. The thickness of the metal sheet is for example comprised between 0.2 mm and 0.5 mm.

Figure 2:
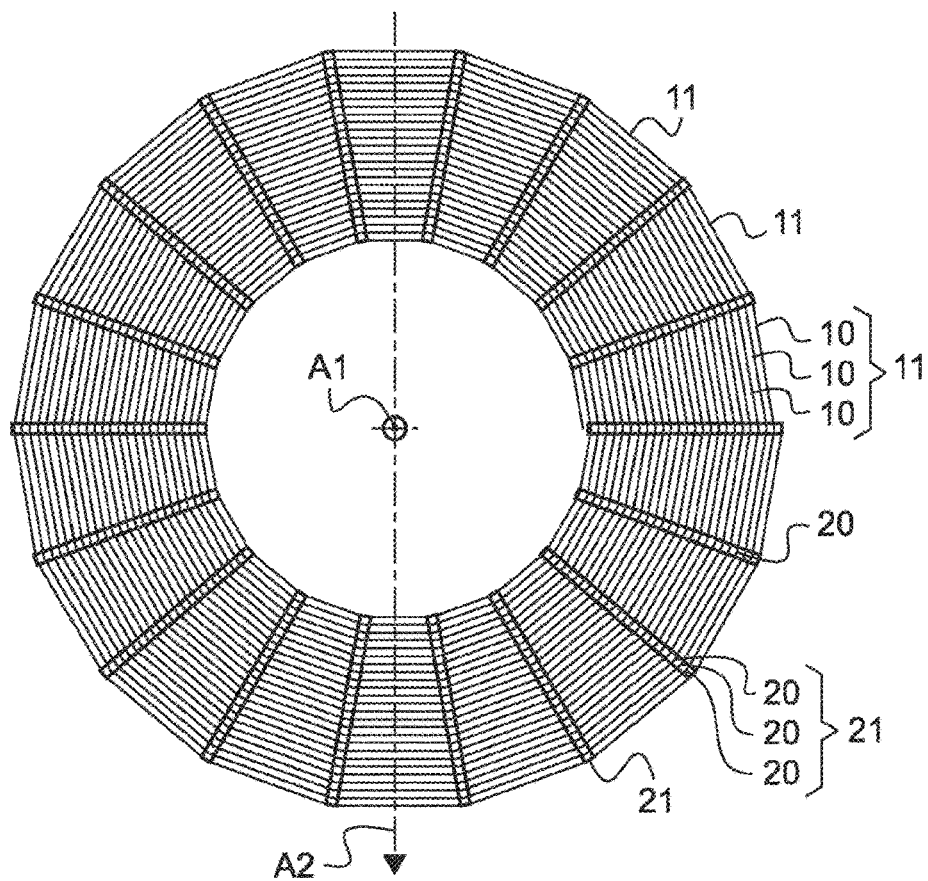
FIG. 2 is a schematic view from above of the base of the stator body of FIG. 1.

Here, as shown in FIG. 2, a sheet is wound in a spiral around the longitudinal axis A1 so as to form all of the layers 10 of the base 2. In a variant which has not been depicted, the layers could be formed by a concentric assembling of a plurality of metal sheets.

The winding of the metal sheet that forms the base 2 does not have a radius of curvature that varies linearly. Rather, the winding is formed of a plurality of flat portions separated pairwise by fold lines. In each layer, the fold lines are situated at the fold lines of the previous layer.

The base 2 thus comprises a plurality of angular portions 11 separated from one another by these stacks of fold lines. In FIGS. 1 and 2, the base 2 is more specifically formed of eighteen angular portions 11 which therefore extend over eighteen angular sectors about the longitudinal axis A1, each angular sector subtending an angle of 20 degrees. An angular portion 11 is defined here as being a segment of the base 2 extending over the entire thickness of the base 2, which is to say along the longitudinal axis A1, and from the internal face 30 to the external face 31 of the base 2. Each angular portion 11 therefore comprises a plurality of layers 10 of sheet metal. For example, in FIG. 2, three layers 10 belonging to the one same angular portion 11 have been referenced. An angular portion 11 comprises for example between 80 and 400 layers 10.

As shown by FIG. 2, within an angular portion 11, the layers 10 are stacked in a substantially radial direction A2, which is to say here perpendicular to the longitudinal axis A1. Here, an electrically insulating material is placed between the various neighboring layers 10. Neighboring layers 10 in this case are successive layers 10 in the stack that forms an angular portion 11. The electrically insulating material consists for example of a thin film applied to the metal sheet prior to winding. The film is, for example, an inorganic film measuring 2 μm to 5 μm in thickness and which vitrifies when the stator is heated to a very high temperature. It makes it possible to reduce eddy currents in the stator during operation.

It may of course be seen from this FIG. 2 that, in this embodiment, each layer 10 of each angular portion 11 is connected by a fold line 20 to a layer 10 of an adjacent angular portion 11. Two adjacent angular portions 11 here are two angular portions 11 that are situated side by side. With the exception of the two layers 10 situated at the two ends of the winding, each layer 10 of each angular portion 11 is connected by two fold lines 20 to two layers 10 each situated in one of the two adjacent angular portions 11.

A fold line 20 here is a section of sheet which extends parallel to the longitudinal axis A1 and which is curved about an axis parallel to this axis A1, which is to say has a non-zero curvature in a plane orthogonal to the longitudinal axis A1. Here, each fold 20 thus has substantially the shape of an arc of a circle about an axis parallel to the longitudinal axis A1 and situated between the longitudinal axis A1 and the fold 20. The set of fold lines 20 which are situated between two adjacent angular portions 11 form a fold zone 21 which extends in a radial plane. For example, in FIG. 2, three fold lines 20 belonging to the same fold zone 21 are referenced.

The fold lines 20 are specifically situated at the fixings of the teeth 4 to the end face 3 of the base 2. Here, for each pair of adjacent angular portions 11, the fold lines 20 comprised between the two angular portions 11 face the one same tooth 4 or are even in contact therewith. Here, as illustrated in FIG.

5, the root 41 of the tooth 4 is situated facing the fold zone 21. More specifically, each tooth 4 is centered on a distinct fold zone 21.

Whatever the embodiment of the invention, at least one layer 10 of each angular portion is flat. Since the layers 10 extend along the longitudinal axis A1, each flat layer 10 therefore extends in a plane parallel to the longitudinal axis A1.

In a first embodiment depicted in FIGS. 1 and 2, all the layers 10 of each angular portion 11 are flat. In addition, as may be seen from FIG. 2, all the layers 10 of each angular portion 11 are substantially parallel to one another. Substantially parallel here means that the planes in which two neighboring layers extend are either strictly parallel or very slightly inclined relative to one another by an angle of less than 1 degree.

Here, for each angular portion 11, the greater the distance between a flat layer 10 and the longitudinal axis A1, the greater its length. The length of a flat layer 10 is defined between the two fold lines 20 to which it is attached, which is to say here defined as being its dimension in a substantially orthoradial direction.

In this first embodiment, all the fold lines 20 of a fold zone 21 have a substantially constant curvature. That means that in a plane perpendicular to the longitudinal axis A1 and passing through the base 2, the fold lines 20 of the one same fold zone 21 have a substantially identical profile.

Each fold zone 21 has, in an orthoradial direction specific to it, a constant width. The width here is the dimension of the fold zone 21 in the associated orthoradial direction.

As depicted in FIG. 2, the base 2 here has the overall shape of an octadecagon with rounded vertices. Generally, in this first embodiment, the base 2 has the overall shape of a polygon with a number of sides equal to the number of angular portions 11.

Two flat layers 10 connected to one another by the one same fold line 20 extend in two planes that are inclined relative to one another.

Figure 3:
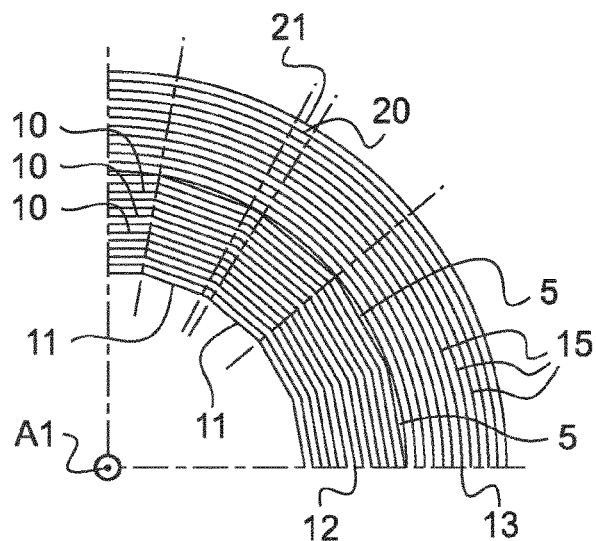
FIG. 3 is a schematic view from above of part of the base of a stator body according to a second embodiment of the invention.

In a second embodiment depicted in FIG. 3, each angular portion 11 comprises flat layers 10 and curved layers 15. The curved layers 15 here are curved toward the inside about an axis parallel to the longitudinal axis A1. Here, each curved layer 15 thus has substantially the shape of an arc of a circle about an axis parallel to the longitudinal axis A1 and situated between the longitudinal axis A1 and the curved layer. For each angular portion 11, the curved layers 15 have a curvature that remains strictly positive over the entirety of the angular portion 11.

In the example of FIG. 3, each angular portion 11 comprises an inner half 12, close to the longitudinal axis A1, which comprises flat layers 10 and an outer half 13, distant from the longitudinal axis A1, which comprises curved layers 15.

The inner half 12 takes the form for example of a base 2 according to the first embodiment. The outer half 13 takes for example the form of a conventional cylindrical base according to the current state of the art.

The curved layers 15 simplify the manufacture of the base 2 as the outer half 13 can be manufactured in the conventional way without bending. In addition, because the curved layers 15 are situated at the periphery of the base, the bending stress on the metal sheet is modest and the loss in terms of magnetic performance is acceptable.

In this second embodiment, as shown by FIG. 3, because of their difference in shape, the inner half 12 and the outer half 13 define between them a channel 5. The channel 5 runs the entire circumference of the generally annular base 2.

The channel 5 is an empty space which may for example be used for circulating a liquid coolant. The channel 5 may also be used for inserting fixing means, for example for fixing the teeth 4 to the base 2 or for fixing the stator body 1 to a protective casing.

Figure 4:
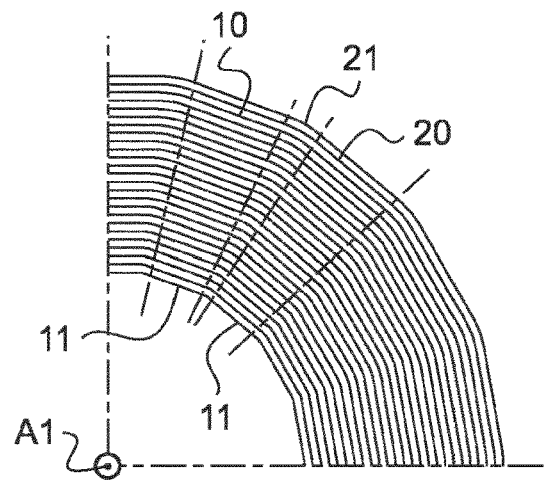
FIG. 4 is a schematic view from above of part of the base of a stator body according to a third embodiment of the invention.

In a third embodiment depicted in FIG. 4, the fold lines 20 are curved to increasingly lesser extents with greater distance from the longitudinal axis A1. That means that the radius of curvature of the fold lines 20, in a plane perpendicular to the longitudinal axis A1 and passing through the base 2, increases with distance from the longitudinal axis A1.

In this third embodiment, for each angular portion 11, all of the layers 10 are flat. Each fold zone 21 has, in an orthoradial direction specific to it, a width that increases with distance from the longitudinal axis A1. The length of the flat layers 10 of the one same angular portion 11 is substantially constant here.

As is clearly evident from the manufacturing method described later on, this third embodiment makes it possible to reduce the number of bending steps and therefore to simplify the manufacture of the base 2. Further, while the fold zones 20 are admittedly wider, they are situated chiefly at the periphery of the base 2, which is where the bending stress on the metal sheet is modest and the loss in terms of magnetic performance is acceptable.

In a fourth embodiment which has not been depicted, in the manner of the second embodiment, the base comprises an inner half close to the longitudinal axis and an outer half distant from the longitudinal axis. In each half, working away from the longitudinal axis, the folds are curved to increasingly lesser extents. However, for each half, the curvature of the folds decreases beyond a predetermined curvature that is identical for both halves.

Because of the increase in the curvature of the folds on transitioning from the inner half to the outer half, the two halves are once again able to delimit a channel.

In all the embodiments, recessed reliefs 6 are provided on the end face 3 of the base 2. Each recessed relief 6 forms an indentation in the base 2 with respect to the end face 3. In other words, a recessed relief 6 defines a local reduction in the thickness of the base 2. Here, all the recessed reliefs 6 are identical. As an alternative, the shape of the recessed reliefs could vary from one relief to another. The recessed reliefs 6 may have a surface with sharp edge corners, as in the example of FIG. 5, or else a smooth surface.

The recessed reliefs 6 here are situated at the fixings of the teeth 4 to the base 2. The stator body 1 here has one recessed relief 6 per tooth 4. Each recessed relief is associated with a tooth 4. As is clearly shown in FIG. 5, each tooth 4 has a root 41 of complementary shape designed to engage, partially or until it comes into contact with the base 2, in the recessed relief 6 associated therewith.

In practice, the recessed relief here has a flat bottom which extends orthogonal to the longitudinal axis A1, from the internal face 30 to the external face 31 of the body 2, and which is flanked by two rims that are inclined at 45 degrees.

Figure 5:
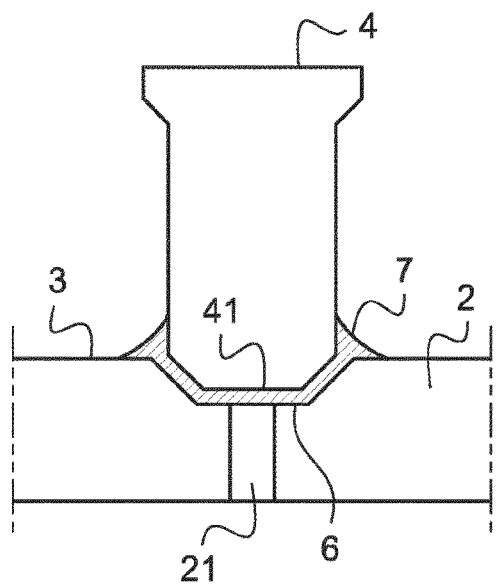
FIG. 5 is a schematic view in section of one example of a fixing of a tooth to the base of the stator body of FIG. 1.

In the example of FIG. 5, the tooth 4 is positioned some distance from the base 2. The empty space between the root 41 of the tooth and the base 2 is filled here with an adhesive material 7, for example an inorganic thermosetting adhesive, or an adhesive of the epoxy type.

As may be seen in FIG. 3, each recessed relief 6 covers the fold zone 21 in its entirety. That means that the recessed relief 6 is wider than the fold zone 21. As a variant, the recessed relief could be located entirely within the fold zone.

The recessed reliefs 6 make it possible to improve the fixing of the teeth 4 to the base 2, for example by increasing the bonding area. The recessed reliefs 6 also make it possible to improve the circulation of the magnetic flux at the teeth, on the one hand, because they reduce the volume of the fold zone 21.

In all of the embodiments, the magnetic sheet here has anisotropic crystalline microstructures. The sheet is then said to be an "oriented grain" sheet. These microstructures, which may for example be grooves obtained by specific rolling-press rolling, make it possible to reduce the resistance of the sheet to the magnetic flux in a given direction.

Here, each flat layer 10 has its oriented-grain oriented substantially parallel to the end face 3 and to the plane in which this flat layer 10 extends. At every point on a layer 10 or on a fold line 20, the grain here is oriented parallel to the end face 3 and tangential to the layer 10 or to the fold line 20. That means that the grain of the layers 10 is therefore oriented in a substantially orthoradial direction.

In an oriented-grain sheet, magnetic conductivity is greatly improved in the direction of the grain. As a result, the base 2 here has a high magnetic conductivity tangentially to the winding of the sheet, which is to say in substantially orthoradial directions.

In the angular portions 11, this orientation of the grain allows better circulation of the flux between two adjacent teeth 4. Oriented-grain sheets experience a sharp reduction in their magnetic performance when they are curved. The flat layers 10 therefore make it possible to limit the reduction in the magnetic performance of the oriented-grain sheet metal.

Here, the teeth 4 also comprise a stack of oriented-grain sheets.

As a variant, it is possible to use metal sheets that are not oriented-grain sheets.

A method for manufacturing a stator body as described above is now detailed with reference to FIGS. 6 and 7.

Figure 6:
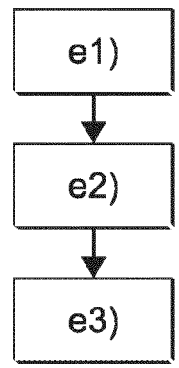
FIG. 6 illustrates a sequence of steps of a method for manufacturing the base of the stator body of FIG. 1.

As shown by FIG. 6, the method comprises three main steps:
- a step e1) of winding the metal sheet around a support;
- a step e2) of bending the metal sheet as it is being wound;
- a step e3) of manufacturing teeth and fixing them at the folds.

Here, the support (not depicted) is a polygon extending along an axis of rotation corresponding to the longitudinal axis A1 and having as many sides as there are angular portions 11 of the base 2. During step e1) the metal sheet, which is originally substantially flat (in practice either perfectly flat, or lightly curved because wound around large reels with very large radii of curvature), is wound around the rotating support.

During step e2), during the winding, the sheet is bent at determined positions. These determined positions are calculated prior to winding so as to arrange the fold lines 20 formed in contact with one another, for example so that the fold lines 20 of the one same fold zone 21 are radially aligned. The bending is thus performed at sheet length intervals that progressively increase as the winding progresses.

Step e2) here is performed during winding, which is to say during step e1). Step e2) here begins substantially at the same time as the winding.

The determined positions also mean that the sheet metal can be pressed cut or machined before it is wound so as to form the recessed reliefs 6. Cutouts may for example be made on one lateral side of the sheet. These cutouts may more specifically be produced on the side of the sheet that generates the end faces 3 at the time of winding. Thus, during the winding, the cutouts are arranged in contact with one another so as to form the recessed reliefs 6. As a variant, the recessed reliefs could be machined on the end face after the sheet has been wound.

Figure 7:
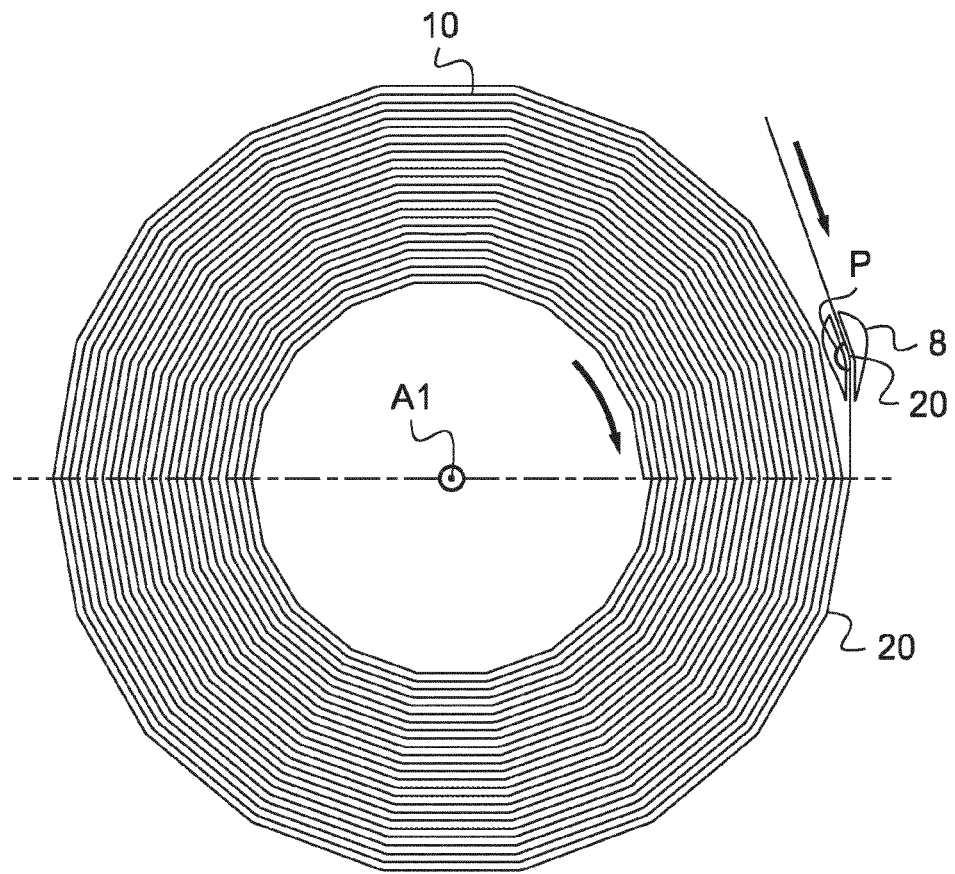
FIG. 7 schematically illustrates winding and folding steps of the method of FIG. 6.

As illustrated in FIG. 7, the bending is performed across the entire width of the sheet along the longitudinal axis A1. The bending here is performed by clamping the sheet for example by means of an assembly 8 comprising a punch and a die. This die may also serve to form the recessed reliefs 6, for example if the sheet is pressed at the same time as it is bent.

In order to manufacture a base 2 according to the first embodiment, the metal sheet is bent throughout the winding operation. The sheet here is bent at a fold angle P that is substantially constant. The fold angle here is defined as being the angle imparted to the fold that faces toward the longitudinal axis A1. The fold angle here is equal to 360 degrees divided by the number of teeth 4.

In order to manufacture a base 2 according to the second embodiment, it is possible first of all to manufacture the inner half 12 of the base 2 and then to manufacture the outer half 13 of the base 2. During the manufacture of the inner half 12, the sheet is bent throughout the winding operation. To manufacture the outer half 13, another sheet may conventionally be wound onto a cylindrical support without performing any bending during winding. Once the two halves have been manufactured, the inner half 12 is nested inside the outer half 13. The outer half 13 may also be manufactured by halting the bending during the winding of the sheet.

In order to manufacture a base 2 according to the third embodiment (FIG. 4), it is possible to bend the sheet only on the first revolution of the first few revolutions of the sheet, for example the first 2 to 5. Thereafter, the sheet may be wound without bending. It then conforms to the current peripheral shape of the base 2 in the process of being wound, and this then generates fold lines 20 of increasingly lesser curvature.

In order to manufacture a base 2 according to the third embodiment (FIG. 4), it is also possible to bend the sheet throughout the winding operation with a fold angle that varies, in this instance one that becomes increasingly large.

In order to manufacture a base 2 according to the fourth embodiment (not depicted in the figures), two bases 2 according to the third embodiment may be manufactured and then nested one inside the other.

During step e3), the teeth 4 are manufactured by stacking sections of a flat sheet and are then attached to the base 2. The teeth 4 are specifically fixed at the fold lines 20. As a variant, the teeth could be produced in one single piece with the base, for example by cutting slots into the metal sheets before winding them.

The present invention is not in any way limited to the embodiments described and depicted but rather the person skilled in the art will know how to apply any variant that is in accordance with the invention.

The invention claimed is:

1. A stator body for an axial flux electric machine, comprising:
   a base comprising layers of metal sheet which are wound around a longitudinal axis, the base having an end face substantially orthogonal to the longitudinal axis, and teeth distributed and fixed on the end face of the base, wherein the base comprises a plurality of angular portions distributed about the longitudinal axis, each angular portion comprising a plurality of said layers which are each flat such that no bending stress is applied to the flat layers when the metal sheet is wound around the longitudinal axis, each of said layers which is flat being attached to a layer of an adjacent angular portion by a fold situated at the fixing of one of the teeth to the base.

2. The stator body as claimed in claim 1, wherein each angular portion comprises at least yet another of said layers which is curved about an axis parallel to the longitudinal axis.

3. The stator body as claimed in claim 1, wherein the base comprises, on the end face, at least one recessed relief, at least one of said teeth having a shape part of which complements that of the recessed relief and is set into the recessed relief.

4. The stator body as claimed in claim 1, wherein each angular portion comprises at least two layers attached by at least two folds to at least two layers of an adjacent angular portion, said at least two folds having radii of curvature that increase with their distance from the longitudinal axis.

5. The stator body as claimed in claim 1, wherein each angular portion comprises at least two layers attached by at least two folds to at least two layers of an adjacent angular portion, said at least two folds having radii of curvature that are substantially constant.

6. The stator body as claimed in claim 1, wherein said layer which is flat extends in a plane parallel to the longitudinal axis.

7. The stator body as claimed in claim 1, wherein said layer which is flat is grain-oriented with the grain running substantially parallel to the end face and to the plane in which said layer which is flat extends.

8. The stator body as claimed in claim 1, wherein each angular portion comprises at least two layers of metal sheet, two neighboring layers being separated by an electrically insulating layer.

9. A method for manufacturing the stator body as claimed in claim 1, comprising:
- winding the layers around a support;
- during the winding, bending the metal sheet in such a way as to form the folds without bending the plurality of said layers; and
- manufacturing the teeth and fixing the teeth onto the end face.

\* \* \* \* \*